United States Patent [19]

de Gennes

[11] 4,022,310
[45] May 10, 1977

[54] FRICTION DISC WITH BONDED LINING
[75] Inventor: Gérard de Gennes, Senlis, France
[73] Assignee: Societe Anonyme Francaise du Ferodo, Paris, France
[22] Filed: Dec. 9, 1975
[21] Appl. No.: 639,123
[52] U.S. Cl. ............................ 192/107 C; 188/234; 156/91
[51] Int. Cl.² ........................................ F16D 13/60
[58] Field of Search ................ 192/107 C; 188/234
[56] References Cited
UNITED STATES PATENTS 2,283,113  5/1942  Wemp ........................ 192/107 C
2,380,900  7/1945  Wellman ..................... 192/107 C Primary Examiner—Benjamin W. Wyche
Attorney, Agent, or Firm—Young & Thompson

[57] ABSTRACT

The invention relates to friction discs of the progressive engagement type, especially for clutches of heavy automobile vehicles, the disc comprising two annular friction linings extending respectively on both sides of and in contact with a cut-out corrugated support, each lining being fixed individually by continuous glueing zones on this support, along parts of the corrugation of the support which are in contact with the lining. The surface area of the glueing zones should be between 5 and 35%, and preferably about 10% of the surface area of the lining. In a modification, each lining is fixed on the support, not only by the glueing zones but also by at least one rivet per zone arranged at right angles to each glueing zone. The riveting operation is preferably carried out after glueing and before the adhesive is polymerized or set.

4 Claims, 5 Drawing Figures

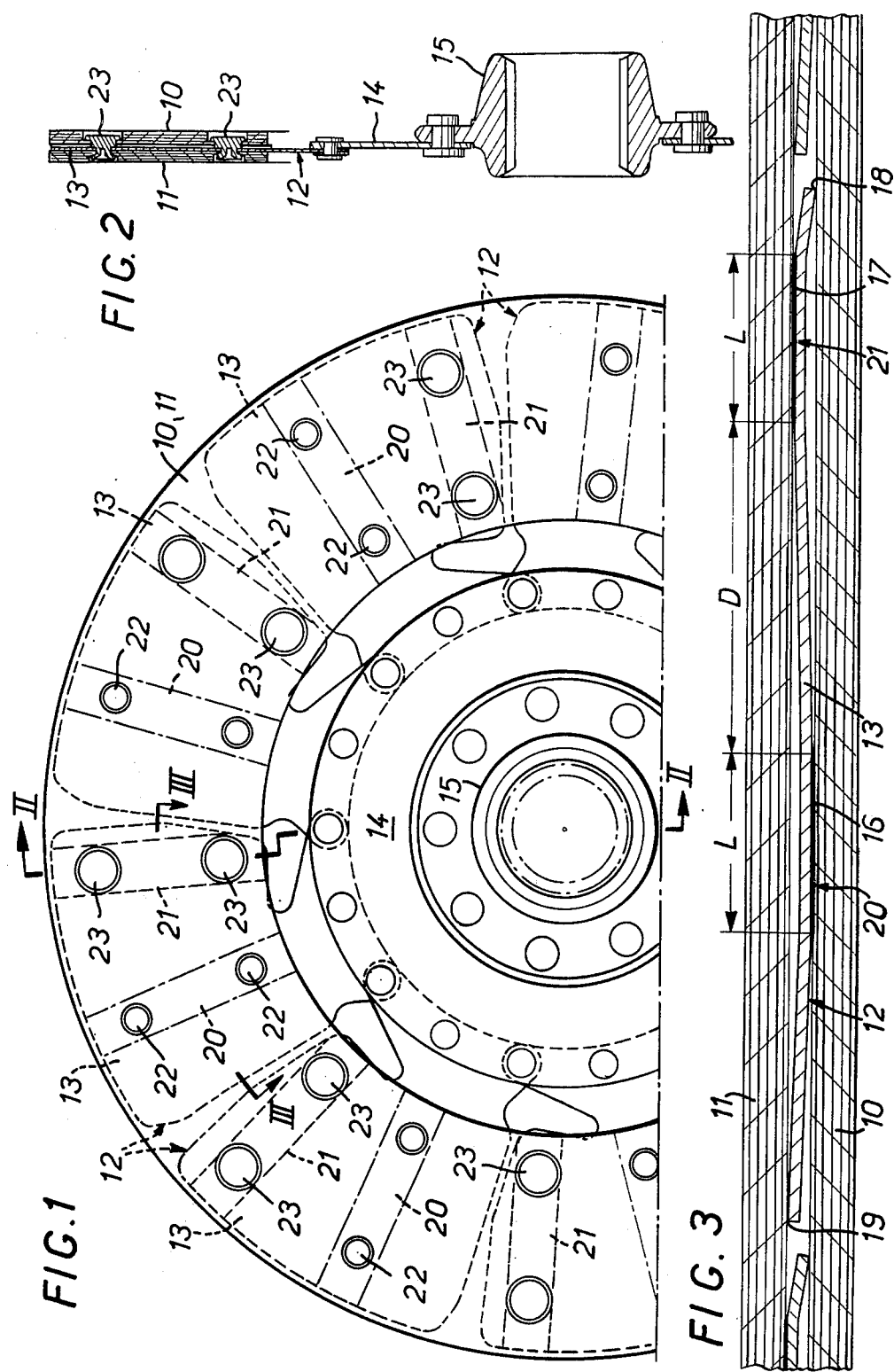

FRICTION DISC WITH BONDED LINING

The present invention relates to a friction disc, especially for clutches, this disc being of the gradual or progressive engagement type comprising two annular friction linings extending respectively on both sides and in contact with a cut-out corrugated support, each lining being individually fixed on this support along parts of the corrugations of this support which are in contact with the said lining.

The linings are generally fixed to the cut-out and shaped support by means of rivets. The Applicants have found that no matter how strong these rivets may be, they do not stand-up satisfactorily to high speeds of rotation, especially above 6,000 r.p.m. for friction linings of heavy lorry vehicles, and this may result in the bursting of the linings.

The present invention has for its object a friction disc of the progressive engagement type, characterized in that each lining is fixed to the cut-out and corrugated support by continuous areas of glueing. The surface of the glueing areas is preferably comprised between 5 and 35% of the surface area of the lining.

By virtue of this arrangement, the disc is able to withstand high speeds of rotation.

The cut-out and corrugated support preferably comprises a circular series of shaped fins, each having at least one portion in contact with one of the linings and at least one portion in contact with the other lining, and the glueing areas are provided along at least some of the said contact portions.

According to another characteristic feature, each lining is fixed to the support, not only by the said glueing areas but also by at least one rivet arranged at right angles to each glueing area.

With such an arrangement, there has been observed a remarkable behaviour of the disc at very high speeds of rotation of the order of 8,000 r.p.m. and even higher, especially with friction linings of heavy vehicles.

The present invention has also for its object a method of manufacture of a friction disc of this kind.

This method is characterized in that the three elements constituted by the two linings and the support are manufactured, at least a part of these elements is coated with glue, along the regions corresponding to the glueing areas and, before the glue sets, the riveting operation is carried out with rivets in order that these latter may play the part of a joint-clamping means.

This arrangement makes it possible to dispense with putting the disc assembly in a press during the setting of the glue and subjecting the support to deformation during setting which involves a liability of disturbing the conditions of setting.

In addition, this arrangement has the advantage of permitting surface coating beyond the actual glueing areas, since the action of the rivets at the level of these areas alone limits the glueing to these areas. This makes it possible to restrict the precautions to be taken in glueing.

Forms of embodiment of the invention are described below by way of example, reference being made to the accompanying drawings in which:

FIG. 1 is a partial view in elevation of a friction disc according to the invention;

FIG. 2 is a corresponding view of this disc in crossection, taken along the broken line II-II of FIG. 1;

FIG. 3 is a partial developed view to a larger scale, in cross section taken along the circumferential line III-III of FIG. 1;

Figure 4:
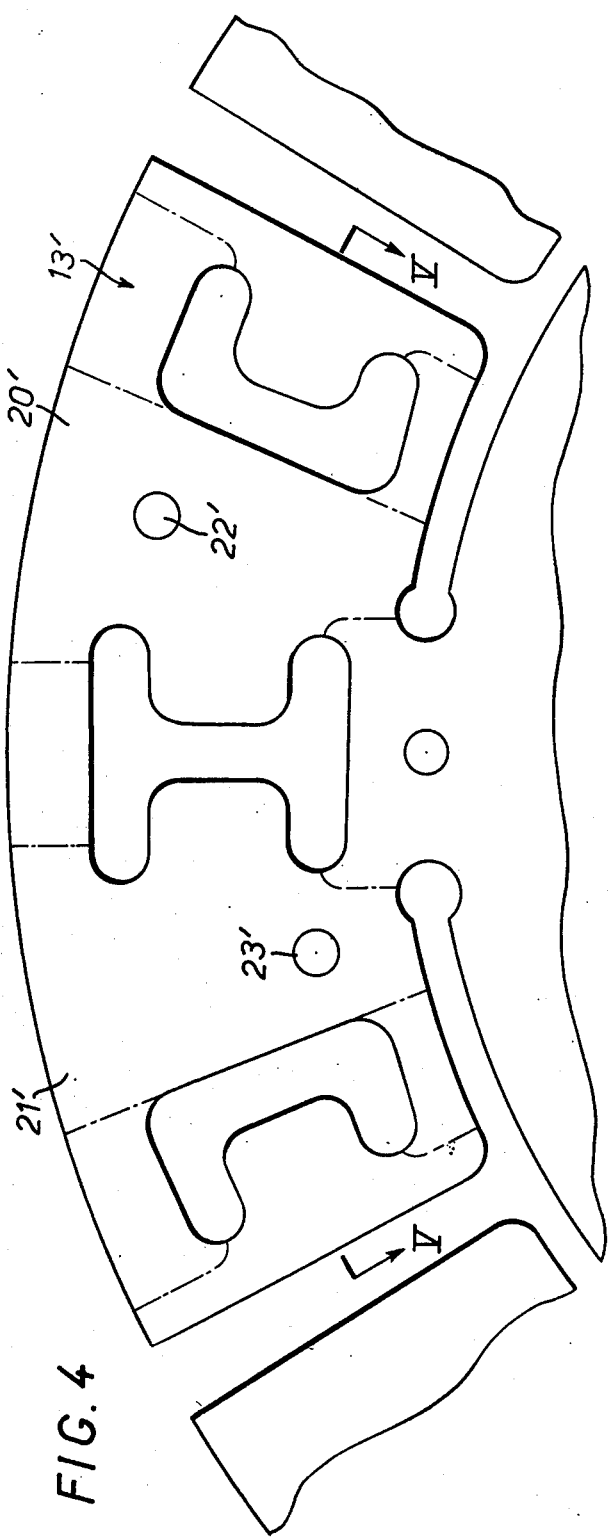
FIG. 4 is a view in elevation of an alternative form of friction disc fin.

The form of construction shown in FIGS. 1 to 3 relates by way of non-restrictive example to a clutch friction disc, especially for a heavy automobile vehicle. This disc comprises two substantially flat friction linings 10 and 11 of generally annular shape, extending respectively on both sides of a cut-out and corrugated support 12 permitting progressive engagement of the disc. The support 12 comprises a circular series of shaped fins 13 fixed to a disc-plate 14 mounted in turn on a hub 15.

Each shaped find 13 is adjacent to the lining 10 by a contact portion 16 and is adjacent to the lining 11 by a contact portion 17.

Between the portions 16 and 17, the fin 13 extends freely in the non-clamped condition of the disc, between the linings 10 and 11, except at its extremities at 18 when they touch the lining 10, and at 19 when they touch the lining 11.

Each fin 13 is fixed to the lining 10 by a glueing zone 20 along the portion 16, and to the lining 11 by a glueing zone 21 along the portion 17.

As can be seen from FIG. 1, the glueing zones 20 and 21 are oblong and extend radially along substantially the whole of the radial length of the common contact portion between the fins 13 and the linings 10 and 11.

The surface area of the glueing zones 20 of the fins 13 on the lining 10 or of the glueing zones 21 of the said fins 13 on the lining 11 is comprised between 5 and 35% and is advantageously in the vicinity of 10% of the surface area of the lining 10 or 11.

In the example shown in FIGS. 1 to 3, the width L of each glueing zone 20, 21 is equal to about half the distance D separating the zones 20 and 21, this distance being calculated along the circumferential line III-III corresponding to the mean radius of the annular linings 10 and 11.

In addition, the linings 10 and 11 are fixed to the support 12 by rivets 22 and rivets 23 respectively. At least one rivet 22, and preferably two rivets 22 spaced apart radially, are provided at right angles to each glueing zone 20, whereas, in the same way, two rivets 23 are provided at right angles to each glueing zone 21.

In order to manufacture a disc such as that which has just been described with reference to FIGS. 1 to 3, the elements constituted by the lining 10, the lining 11 and the support 12 comprising the fins 13 are first manufactured. At least part of these elements is coated with glue over at least the regions corresponding to the glueing zones 20 and 21. Before the setting or polymerization of the adhesive, the riveting operation is carried out with the rivets 22 and 23 in order that, during the setting of the adhesive, these latter play the part of a jointclamping means. In this way, it becomes unnecessary to put the whole of the disc assembly in a press during the setting of the glue and avoids subjecting the support to deformation during setting, which is liable to disturb the conditions of setting.

More particularly, the internal faces of the linings 10 and 11 are coated with cold adhesive applied from a gun, a mask being previously arranged on the said faces so as to leave uncovered only the regions corresponding to the glueing zones 20 and 21.

The three elements 10, 11 and 12 are joined together. The riveting operation is carried out before the adhesive is set by means of the rivets 22, 23. From that time, these rivets hold together the assembled disc which can immediately be handled without special precaution and it is only necessary to wait until the polymerization is complete for the disc to be put into service.

With a disc such as that which has just been described with reference to FIGS. 1 to 3, and having an external diameter of 430 mm. and nine fins 13, ten tests have shown that this disc has an excellent performance at a speed of rotation of 8,000 r.p.m., whereas tests carried out under the same conditions with similar discs not provided with glueing zones 20 and 21 have shown that the linings burst at a speed of rotation of 6,000 r.p.m.

It should be noted that the linings 10 and 11 are directly glued along the zones 20 and 21 to the fins 13 themselves.

Figure 5:
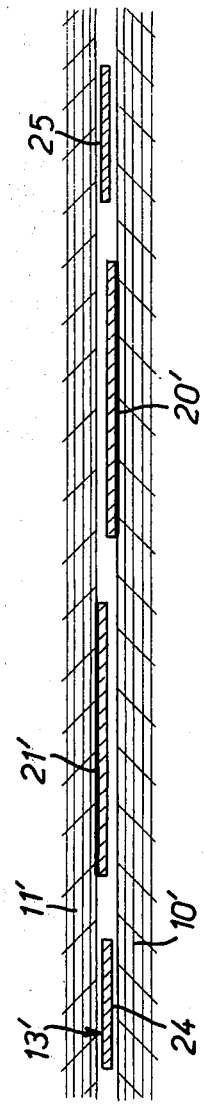
FIG. 5 is a view in cross-section taken along the line V—V of FIG. 4.

Reference will now be made to FIGS. 4 and 5, in which the arrangement is similar to that which has been described with reference to FIGS. 1 to 3, and in which the same elements have been given the same reference numbers, followed however by a dash index.

In FIGS. 4 and 5 there can be seen at 20' the glueing zone of the fin 13' on the lining 10', and at 21' the glueing position of the fin 13' on the lining 11'. There can be seen at 22' a rivet for fixing the fin 13' on the lining 10'. The rivet 22' is arranged at right angles to the glueing zone 20', while the rivet 23' is disposed at right angles to the glueing zone 21'.

The surface area of the glueing zones 20' for the fins 13' on the lining 10', or of the glueing zones 21' of the said fins 13' on the lining 11', is between 5 and 35% and advantageously in the vicinity of 20% of the surface area of the lining 10' or 11'.

There can be seen at 24 a part of the fin 13' which is close to the lining 10', and at 25 a part of the fin 13' which is close to the lining 11'. The parts 24 and 25 are intended to come into contact with the linings 1)' and 11' in order to modulate the conditions of progressivity when the thickness of the disc level with the linings is allowed to diminish at the moment of engagement.

The method of manufacture of the disc of FIGS. 4 and 5 is similar to that which has been described for the disc of FIGS. 1 to 3, but the whole of the inner faces of the linings 10', 11' are coated with adhesive, without a mask, by a spraying gun. The action of the rivets at the level of only the zones 20', 21', limits the adhesive to these latter.

The method applied to the disc of FIGS. 1 to 3 could also be applied to the disc of FIGS. 4 and 5 or viceversa. It will be noted that the polymerization may be carried out equally well in the hot or cold state.

What I claim is:

1. A friction disc of the progressive engagement type, comprising two substantially flat annular friction linings extending respectively on both sides and in contact with a cut-out and corrugated support, each lining being individually fixed on said support along parts of the corrugations of the support which are in contact with said lining, each said friction lining being fixed on said cut-out and corrugated support by glueing zones.

2. A friction disc as claimed in claim 1, in which the surface area of said glueing zones is between 5 and 35% of the surface area of said lining.

3. A friction disc as claimed in claim 1, in which said cut-out and corrugated support comprises a circular series of shaped fins each having at least a portion in contact with one of said linings and at least one portion in contact with the other lining, and said glueing zones are provided along at least some of said contact portions.

4. A friction disc as claimed in claim 1, in which each said friction lining is fixed to said support, not only by said glueing zones, but also by at least one rivet disposed at right angles to said glueing zone.

* * * * *